Nov. 26, 1929. J. M. GOW 1,737,457
METER LUBRICATOR
Filed June 13, 1925 2 Sheets-Sheet 2

Inventor
J. M. Gow

Patented Nov. 26, 1929

1,737,457

UNITED STATES PATENT OFFICE

JOHN M. GOW, OF MUSKEGON, MICHIGAN

METER LUBRICATOR

Application filed June 13, 1925. Serial No. 36,875.

This invention relates to improvements in meter lubricators and more particularly to improvements in the meter lubricator forming the subject matter of my U. S. Letters Patent, No. 1,348,559, granted August 3, 1920.

The present invention has for one of its objects to improve and simplify the meter lubricator forming the subject matter of the above-identified patent to the end that it may be manufactured and installed in the meter at a comparatively low cost.

A further object of the invention is the provision of a meter lubricator that may be supplied with oil while the meter is in service and without removing the top of the meter.

A further object of the invention is the provision of a meter lubricator which will not be in the way while the valve mechanism or the registering mechanism of the meter is being repaired.

The foregoing and other objects are attained by the combination and arrangement of parts hereinafter fully described and claimed, and illustrated in the accompanying drawings, wherein:

Corresponding and like parts are referred to in the following description, and designated in the several views of the accompanying drawings, by similar reference characters.

Figure 1:
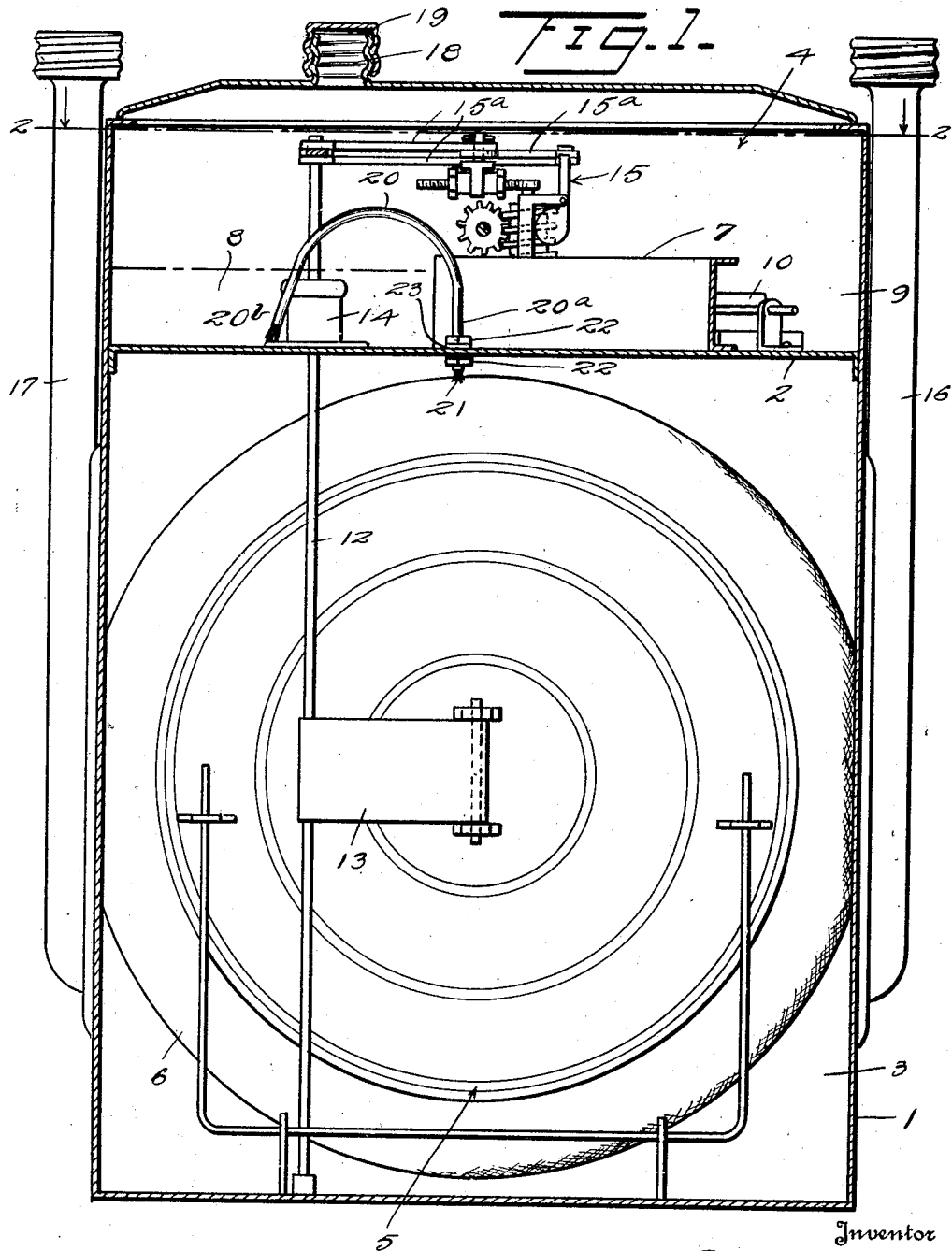
Figure 1 is a view in vertical section of a meter equipped with a lubricator constructed in accordance with the present invention.
Figure 2:
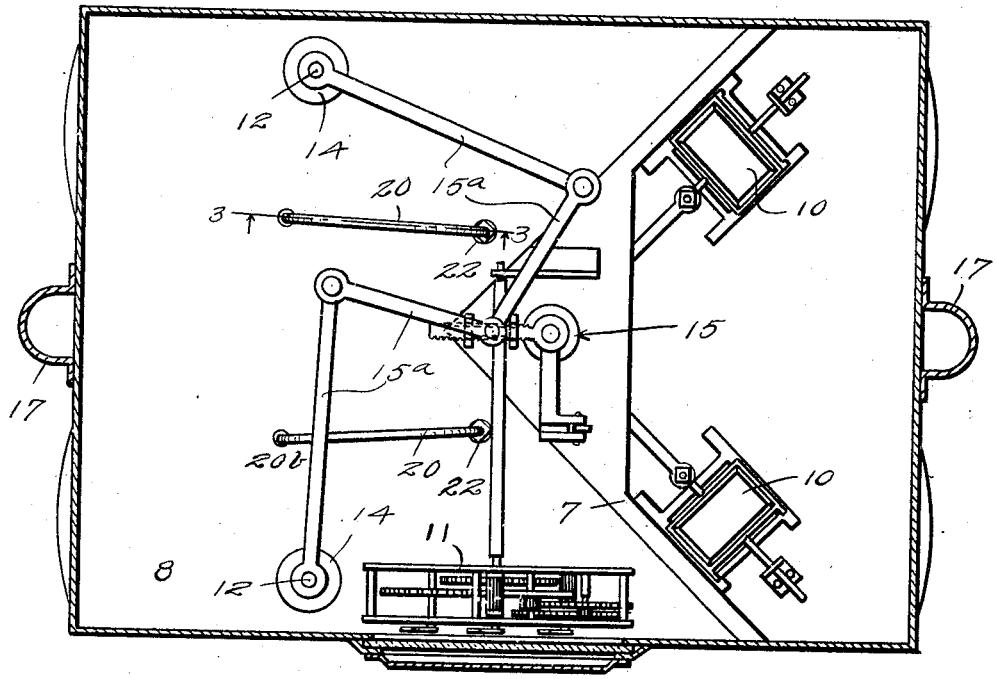
Figure 2 is a sectional view taken on the horizontal plane indicated by the line 2—2 of Figure 1.
Figure 3:
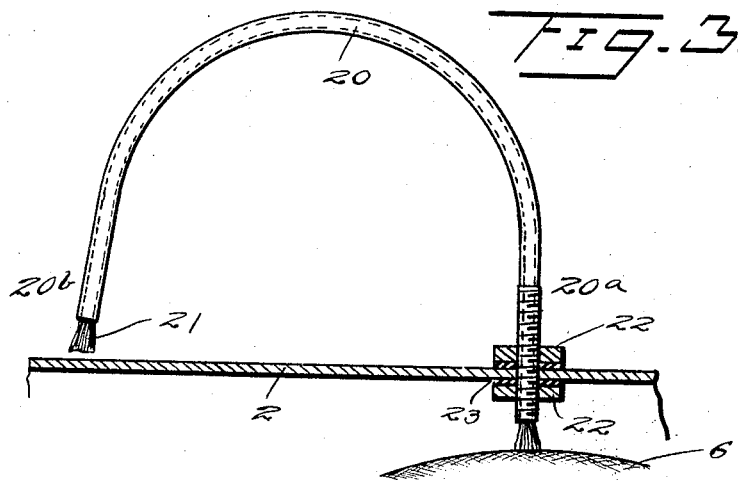
Figure 3 is a detail sectional view taken on the vertical plane indicated by the line 3—3 of Figure 2.

The meter comprises a casing 1 which is separated by a horizontal partition 2 into a lower compartment 3 and an upper compartment 4. Bellows 5 are located in the lower compartment 3, and the leathers or diaphragms thereof are indicated by the numeral 6. A vertical partition 7 of V-contour is secured to the horizontal partition 2 and separates the upper compartment 4 into chambers 8 and 9 into one of which the valves 10 of the meter are located. The valves 10 and the register 11 are operated by shafts 12 which are connected to the bellows 5 by arms 13 and pass through stuffing boxes 14 secured to and extending upwardly from the horizontal partition 2. The shafts 12 are connected to the valves 10 and register 11 by mechanism designated in its entirety by the reference numeral 15. The meter is as far as it has been described of the usual construction and form, and it also includes inflow and outflow pipes 16 and 17, respectively.

In accordance with the present invention the compartment 8 of the meter is employed as an oil reservoir, and to permit the reservoir to be filled the top of the meter is provided with a spout 18 closed by a removable cap 19. The stuffing boxes 14 prevent the escape of oil from the reservoir 8 along the shafts 12. A pair of arcuate tubes 20 are vertically arranged in the reservoir 8 and have their discharge ends 20$^a$ located below the horizontal partition 2 and their intake ends 20$^b$ located above said partition. As the discharge ends 20$^a$ of the tubes 20 are located below the bottom of the lubricant, said tubes have a siphonic action, and they are provided with wicks 21 of wool yarn. The wicks 21 project beyond the ends of the tubes 20. Those ends of the wicks 21 that project beyond the ends 20$^b$ of the tubes 20 contact with the bottom wall of the oil reservoir 8, and those ends of the wicks that project beyond the ends 20$^a$ of the tubes contact with the leathers or diaphragms 6 of the bellows 5. It will thus be seen that the oil is conveyed from the reservoir 8 to the leathers or diaphragms 6 by capillary and siphonic action, and that due thereto the leathers or diaphragms will be maintained in an efficient state of lubrication. The tubes 20 are supported from the horizontal partition or bottom wall of the reservoir 8 by nuts 22 which are located at opposite sides of said partition or wall and which have threaded engagement with the tubes. Washers 23 are positioned between the nuts 22 and the partition or wall to establish a liquid-tight connection between the wall and tubes. The discharge end portions of the tubes 20 are straight and screw threaded for a distance greater than the combined thickness of the partition 2, nuts 22 and washers 23 in order to permit the tubes 20 to be applied to the partition 2 with their intake ends 20$^b$ properly spaced from the partition.

The tubes 20 are located below the arms 15$^a$ of the mechanism 15 and between the shafts 12, and due thereto they will not be in the way during the repair or adjustment of the valves 10, register 11 and the operating mechanism for these parts. Due to the provision of the filling spout 18, the reservoir 8 may be filled while the meter is in service and without removing the top thereof. It is only necessary to provide the meter with the filling spout 18, form openings in the partition 2 for the reception of the end 20$^a$ of the tube 20, and install the tubes, in order to equip it with the lubricator.

What is claimed is:

A meter lubricator, comprising in combination with a meter casing, a horizontal partition therein dividing the interior of the casing into two vertically arranged compartments, a vertical partition in the upper compartment dividing said compartment into two horizontal compartments, one of said compartments being adapted to contain a lubricant for lubrication of the diaphragms of bellows in the lowermost compartment, the horizontal partition provided with an opening connecting the lower compartment with the lubricant compartment, an arcuate tube located in the lubricant compartment, a wick in said tube and having its ends extending beyond the ends of the tube, one end of said tube extending through the opening aforesaid and threaded, nuts mounted on said threaded end of the tube and on opposite sides of said horizontal partition to adjust the tube in the partition, and washers interposed between the nuts and the partition and surrounding the tube to provide a leak-proof joint.

In testimony whereof I affix my signature.

JOHN M. GOW.